United States Patent [19]

Block et al.

[11] Patent Number: 4,687,589

[45] Date of Patent: Aug. 18, 1987

[54] ELECTRONHEOLOGICAL FLUIDS

[76] Inventors: Hermann Block, 112 Station Road, Cogenhoe, Northampton NN7 1LU; Jeffrey P. Kelly, 66 Honey Hill Road, Queens Park, Bedford MK40 4NW, both of England

[21] Appl. No.: 822,320

[22] Filed: Jan. 27, 1986

[30] Foreign Application Priority Data

Feb. 6, 1985 [GB] United Kingdom ............... 8503010
Feb. 12, 1985 [GB] United Kingdom ............... 8503581

[51] Int. Cl.[4] ........................................... C10M 169/04
[52] U.S. Cl. ........................................ 252/73; 252/71; 252/74; 252/75; 252/570; 252/572; 252/581
[58] Field of Search .................. 252/71, 73, 74, 75, 252/570, 572, 581

[56] References Cited

U.S. PATENT DOCUMENTS

| | | | |
|---|---|---|---|
| 2,417,850 | 3/1947 | Winslow | 175/320 |
| 3,047,507 | 7/1962 | Winslow | 252/75 |
| 3,385,793 | 5/1968 | Klass et al. | 252/75 |
| 3,397,147 | 8/1968 | Martinek | 252/75 |
| 3,970,573 | 7/1976 | Westhauer | 252/73 |
| 4,202,670 | 5/1980 | Tateishi | 44/51 |

FOREIGN PATENT DOCUMENTS

| | | |
|---|---|---|
| 1501635 | 2/1978 | United Kingdom . |
| 1570234 | 6/1980 | United Kingdom . |
| 2119392 | 11/1983 | United Kingdom . |
| 2153372 | 8/1985 | United Kingdom . |

OTHER PUBLICATIONS

Dunn et al., J. Polymer Sci., 22, 2243–2260 (1984).
Dunn et al., ACS Polymer Preprints, vol. 25(2), 246–247 (1984).
Trapeznikov et al., Colloid J. USSR, 43, No. 6, 1134–1140 (1979).
UK Application 2 100 740 A, 1–1983, Stangroom.
Pohl et al., J. Phys. Chem., 66 (1962), pp. 2085–2095.

*Primary Examiner*—Robert A. Wax
*Attorney, Agent, or Firm*—Jacobs & Jacobs

[57] ABSTRACT

An electrorheological fluid which comprises a liquid continuous phase and, dispersed therein, at least one dispersed phase and which is capable of functioning as such when at least the dispersed phase is substantially anhydrous.

14 Claims, 16 Drawing Figures

ELECTRONHEOLOGICAL FLUIDS

This invention relates to electrorheological fluids.

U.S. Pat. No. 2,417,850 (Winslow) discloses that certain suspensions, composed of a finely divided solid such as starch, limestone or its derivatives, gypsum, flour, gelatin or carbon, dispersed in a non-conducting liquid, for example lightweight transformer oil, transformer insulating fluids, olive oil or mineral oil, will manifest an increase in flow resistance as long as an electrical potential difference is applied thereto. This effect is sometimes termed the Winslow Effect. The increase in flow resistance resulting from the application of an electric field was originally interpreted as an increase in viscosity, and the materials showing this effect were termed "Electroviscous Fluids". However, subsequent investigations have shown that the increase in flow resistance may be due not only to an increase in viscosity, in the Newtonian sense, but also to an applied electric field induced Bingham plasticity; suspensions exhibiting the Winslow Effect are now referred to as "Electrorheological Fluids".

Research has been effected, and is being intensified, with a view to improving both the dispersed and the continuous phases of electrorheological fluids: see, for example, UK Pat. Nos. 1501635; 1570234; and UK patent application Nos. 2100740A; 2119392A and 2153372A. However, mechanisms by which electrorheological phenomena occur are still not well understood; this lack of understanding and, in particular, the absence of a quantitative theory by which to determine the phenomena hamper the development of improved electrorheological fluids.

All electrorheological fluids for which practical application has been put in prospect have hitherto comprised small quantities of water, believed to be principally associated with the dispersed phase. Rigorous drying prevents electrorheological fluids from exhibiting significant electrorheological phenomena. From an application standpoint, however, the presence of water is undesirable: it may result in device corrosion; operating temperature limitation; and significant electrical power consumption (which may itself lead to thermal instability in the device).

The invention seeks to provide an electrorheological fluid which is improved in at least the above respects.

According, therefore, to the present invention in its broadest aspect there is provided an electrorheological fluid which comprises a liquid continuous phase and, dispersed therein, at least one dispersed phase and which is capable of functioning as such when at least the dispersed phase is substantially anhydrous; preferably the electrorheological fluid is one which is capable of functioning as such when the fluid is substantially anhydrous.

By "anhydrous" is meant herein, in relation to the or each dispersed phase, that the phase, after catalyst removal, is dried under vacuum at 70° C. for 3 days to a constant weight; and, in relation to the continuous phase, that the phase is dried by passage, at an elevated temperature (for example 70° C.) if requried, through an activated alumina column.

Suitably, the electrorheological fluid of the invention is one in which the dispersed phase comprises an electronic conductor. By "electronic conductor" is meant herein a material through which electricity is conducted by means of electrons (or holes) rather than by means of ions. Examples include semiconductors, especially organic semiconductors, which are preferred. By "semiconductor" is meant herein a material having an electrical conductivity, at ambient temperature, from $10^0$ mho cm$^{-1}$ to $10^{-11}$ mho cm$^{-1}$, for example from $10^2$ mho cm$^{-1}$ to $10^{-10}$ mho cm$^{-1}$, typically from $10^{-4}$ mho cm$^{-1}$ to $10^{-9}$ mho cm$^{-1}$, and a positive temperature-conductivity coefficient.

Examples of particularly preferred organic semiconductors include materials which comprise an unsaturated fused polycyclic system for example, violanthrone B. The unsaturated fused polycyclic system is preferably an electron rich one; preferably the unsaturation comprises conjugated $\pi$-bonds, especially an aromatic fused polycyclic system which may comprise at least one heteroatom; for example a nitrogen or an oxygen atom.

One class of such electronic conductor which has been found to be suitable for use in the present invention comprises those organic semiconductors wherein the fused polycyclic system comprises a substituted or unsubstituted porphin or azaporphin system; for example wherein the fused polycyclic system comprises a phthalocyanine system, such as a metallophthalocyanine system. In such systems the metal is suitably a transition metal. By "transition metal" is meant herein any metal from Groups VIA to VIII, inclusive and also Group IB of the Periodic Table, for example copper. For copper phthalocyanine the electrical conductivity at ambient temperature is ca. $10^{-7}$ mho cm$^{-1}$.

The organic semiconductor may be a monomeric, usually a crystalline monomeric, material; alternatively, it may be a polymeric material.

Polymeric organic semiconductors useful in the present invention comprising phthalocyanine moieties may be prepared by replacing the phthalic anhydride used in the conventional synthesis by 1,2,4,5-benzenetetracarboxylic dianhydride.

Another class of such electronic conductors which has been found to be promising for use in the present invention comprises organic semiconductors wherein the fused polycyclic system is contained in a poly(acene-quinone) polymer. Such polymers may be prepared by condensing, utilising a Friedel-Crafts reaction, at least one substituted or unsubstituted acene, such as biphenyl, terphenyl, naphthalene, anthracene, phenanthrene, pyrene, chrysene, triphenylchloromethane, triphenylmethane, fluoranthene, perylene, dibenzypyrene and picene or a sandwich compound, such as ferrocene, with at least one substituted or unsubstituted polyacylated aromatic compound, for example a substituted or unsubstituted aromatic polycarboxylic acid, or a precursor thereof, for example the corresponding acid anhydride or acid chloride such as 1,2,4,5benzenetetracarboxylic dianhydride, in the presence of excess Lewis acid, such as zinc chloride or aluminum chloride. The polyacylated compound preferably comprises pairs, especially two pairs, of acyl groups, or their precursors, attached to vicinal carbon atoms commensurate with each pair partaking in ring formation during the Friedel-Crafts reaction. Poly(acene-quinone) polymers have an electrical conductivity of ambient temperature from ca. $10^{-8}$ to $10^{-9}$ mho cm$^{-1}$.

A further class of organic semiconductor suitable for use in the present invention comprises polymeric Schiff's Bases. These may be prepared by reacting polyisocyanates with quinones. They may also be prepared by analogy with the preparation of certain thermotropic polymers. See, for example, UK Pat. No. 1545106. Aniline Black is such a polymer and may be prepared in known manner: for example by oxidising aqueous aniline hydrochloride with sodium chlorate.

These and other classes of suitable organic semiconductor are disclosed in J. Phys. Chem., 66 (1962) pp. 2085–2095 H. A. Pohl et al. All such materials may have their electrical properties modified by doping.

The continuous phase of the electrorheological fluid of this invention may be any of the liquids previously indicated in this role.

Desirable properties of such liquids are:

1. High boiling point and low freezing point, giving the electrorheological fluid a wide temperature range (ideally from below −40° C. to above at least 150° C.), and low vapour pressure at normal working temperatures;
2. Low viscosity, so that either the electrorheological fluid has a low no-field viscosity or, alternatively, so that a greater proportion of solid can be included in the electrorheological fluid without the no-field viscosity becoming excessive, thus enhancing the Winslow Effect;
3. High electrical resistance and high dielectric strength, so that the electrorheological fluid draws little current and may be used over a wide range of applied electric field strengths;
4. High density (generally greater than 1.2 g cm$^{-3}$ and typically in the range 1.3–1.6 g cm$^{-3}$) since it is preferable for the solid and liquid components of an electrorheological fluid to have the same density to prevent settling on standing; and
5. Chemical stability, to prevent degradation in storage and service, even in the presence of the many potentially catalytic surfaces provided by the particles in an ER fluid, which could give rise to deleterious breakdown products.

It will be clear that not all of these properties will, in general, be found in a given liquid. These need not, however, prevent the liquid from being used as the continuous phase of an electrorheological fluid; thus, a liquid of significantly different density from the dispersed phase may still be in use in the formulation of a viable electrorheological fluid provided that when not in service the fluid is circulated to maintain the dispersed phase in suspension.

Examples of very suitable continuous phase material include fluid hydrocarbons or those disclosed in our UK Pat. Nos. 1501635; 1570234 or UK patent application Nos. 2100740A and 2153372A. Halogenated aromatic liquids are particularly preferred continuous phase materials.

The electrorheological fluids of this invention are prepared by simply comminuting the dispersed phase to the requisite particle size; and then mixing the comminuted dispersed phase with the selected continuous phase. Loadings of as little as 5% v/v of dispersed phase may give an effect, although loadings of at least 15% v/v to 45% v/v, especially from 25 v/v to 35 v/v, are preferred for commercial electrorheological fluids.

In accordance with the present invention, there is provided an electrorheological fluid as aforesaid which is capable of developing a static yield stress of at least 0.5 kPa, for example from 1 to 3 kPa, preferably up to 5 kPa or more, under an applied electric field of no more than 3MVm$^{-1}$ when the fluid is substantially anhydrous. There is also provided an electrorheological fluid as aforesaid which is capable of passing a current density of no more than 400 Am$^{-2}$, preferably no more than 40 Am$^{-2}$, under an applied electric field of no more than 1MVm$^{-1}$ when the fluid is substantially anhydrous.

While the present invention provides, for the first time, a commercially viable anhydrous electrorheological fluid it is to be stressed that it is also an aspect of the present invention to provide an electrorheological fluid as aforesaid containing a minor amount, typically no more than 1% to 5% v/v of the fluid, of water.

The invention will now be described, by way of example, with reference to the accompanying drawings, in which.

Figure 1:
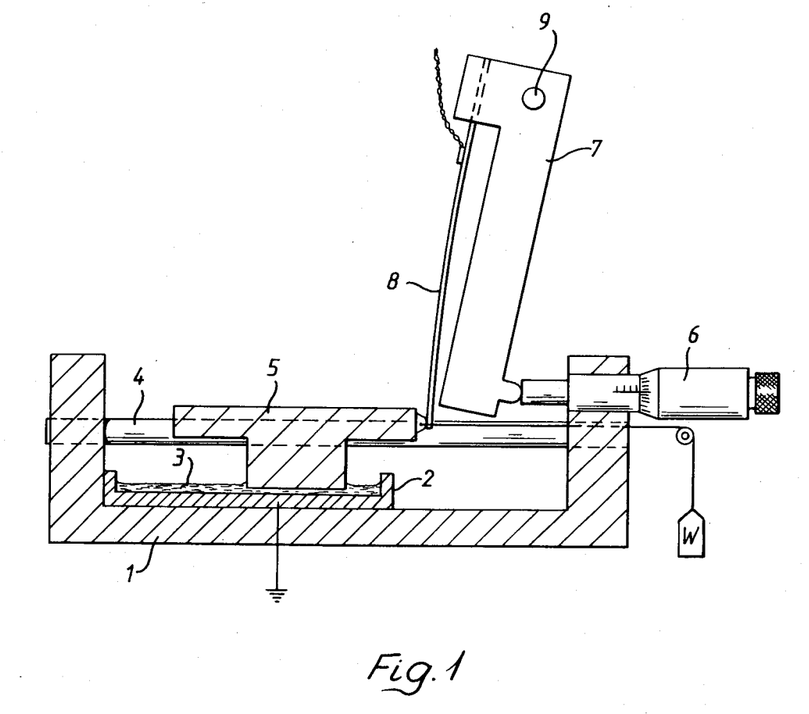
FIG. 1 represents a lateral section of a yield point meter used to determine the variation of developed static yield stress with applied electrical field strength for electrorheological fluids of the invention.

In FIG. 1, the yield point meter 1 comprises a conductive receptacle 2 for the electrorheological fluid 3 under test which receptacle also acts as a first electrode. Above the receptacle are positioned two horizontal parallel ground glass rods 4, polished with silicone grease, on which a second electrode 5 is slidably mounted. The gap between the two electrodes is 0.5 mm. A micrometer screw 6 is mounted to transmit effort to a third order lever 7 a portion of which is arranged as a beam 8 which is deflectable between the second electrode and pivot 9. This beam carries a strain gauge bridge 10 and its flexure is capable of being monitored by related recording instrumentation (not shown).

In use, the electrorheological fluid 3 to be determined is placed in receptacle 2 and the second electrode 5 is stationed on rods 4 over, and in contact with, the electrorheological fluid with a gap as aforesaid. The micrometer screw 6 is then rotated urging beam 8 to force the second electrode along the rods and thus through the fluid. The frictional resistance causes the beam 8 to deflect prior to slip. This maximum deflection is recorded graphically, the peak $\chi_o$ being proportional to the frictional resistance of the apparatus. The two electrodes 2, 5 are next connected in series to a variable 2 kV unidirectional power supply and ammeter (not shown). The experiment is repeated for a series of applied electric field strengths, the recorded peaks $\chi$ being proportional to the frictional resistance and any static yield stress developed in the fluid. A plot of $(\chi - \chi_o)$ against the electric field strength is thus a measure of the dependence of developed static yield stress on applied electric field strength.

Absolute numerical values may be obtained by calibrating the yield point meter. This is effected by leaving the micrometer screw unaltered and instead applying effort to the second electrode 5 by adding a succession of differing loads, for example weights W. The area of the second electrode is $4 \times 10^{-4}$ m$^2$ and thus the yield stresses, represented by $\chi$, can be quantified from the quotient of applied load/area.

The following Examples illustrate the invention.

EXAMPLE 1

A series of electrorheological fluids in accordance with the invention was prepared by incorporating different amounts of copper phthalocyanine (ex Eastman Kodak, dried at 72 hours at 50° C.); or metal-free phthalocyanine (ex ICI plc) in a 3:1 paraffin oil: paraffin grease (ex BDH Chemicals Ltd.), dried by passage through an alumina column (ex Woelm Pharma) at 70° C., the viscosity of which was approximately 50 cS at ambient temperature. They were then tested in the yield point meter hereinbefore described; the test results are depicted graphically in FIGS. 2 to 6 inclusive.

Figure 2:
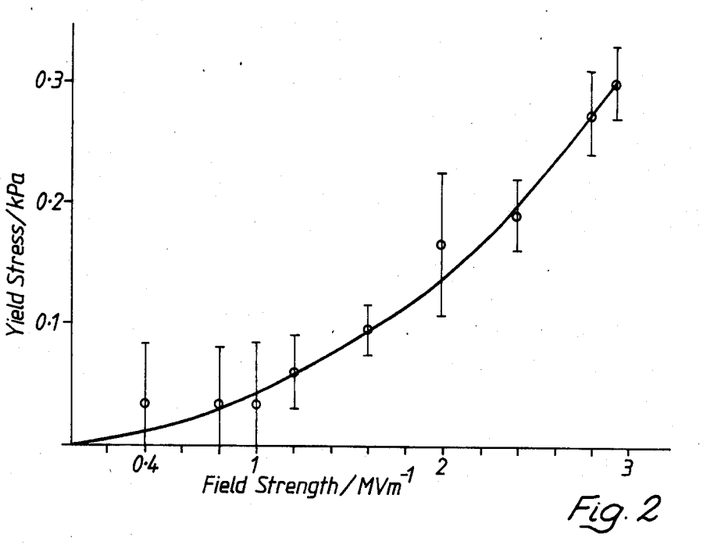
FIGS. 2 to 16 represent graphically the results obtained for exemplified such fluids.
Figure 3:
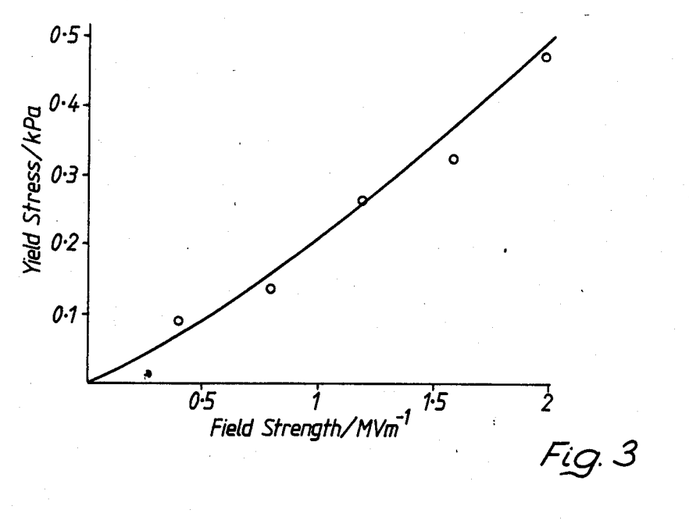
Figure 4:
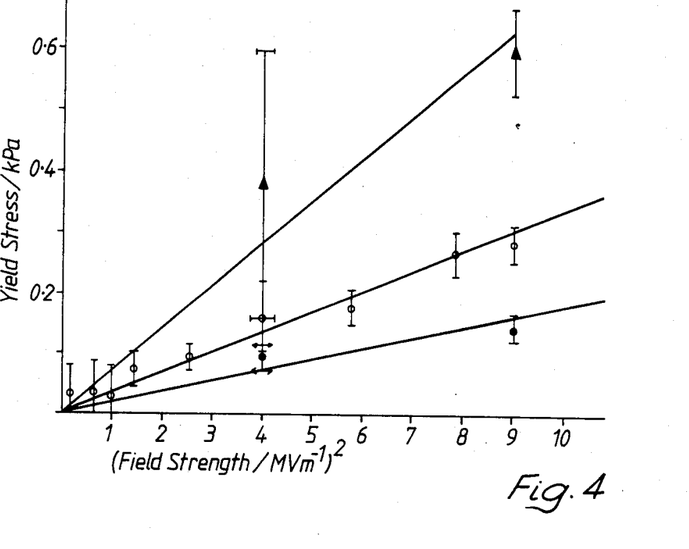
Figure 5:
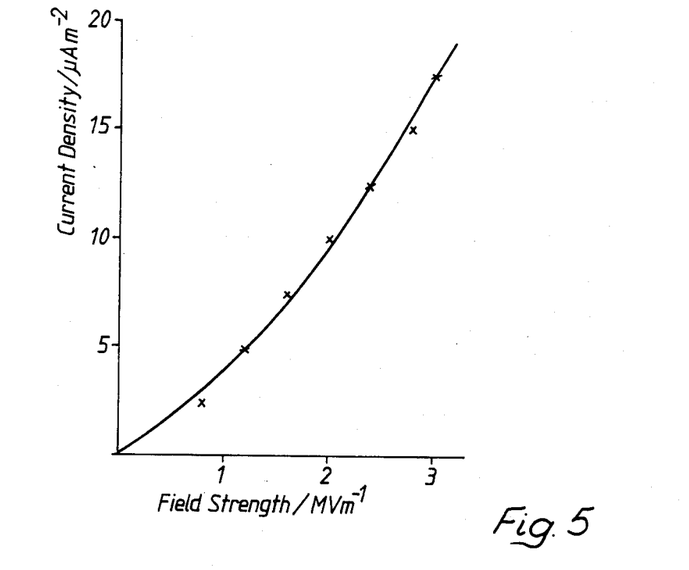
Figure 6:
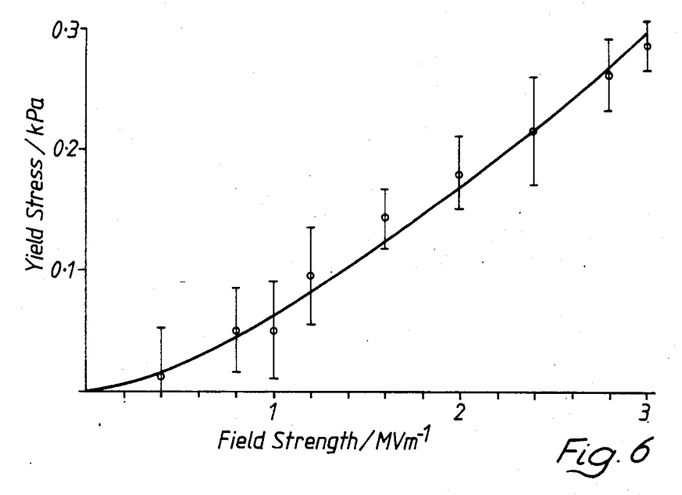

In these Figures:

FIG. 2 depicts, for a 15% v/v copper phthalocyanine suspension, the variation of developed static yield strength (kPa) as ordinate with the applied electric field strength ($MVm^{-1}$) as abscissa;

FIG. 3 depicts, for a 22% v/v copper phthalocyanine suspension, the variation of developed static yield strength (kPa) as ordinate with the applied electric field strength ($MVm^{-1}$) as abscissa;

FIG. 4 depicts, for a 25% v/v (△); 15 v/v (○); and 8% v/v (●), respectively, copper phthalocyanine suspension, the variation of developed static yield strength (kPa) as ordinate with the square of the applied electric field strength ($MVm^{-1})^2$ as abscissa;

FIG. 5 depicts, for the liquid of FIG. 2, the current density passed ($Am^{-2}$) as ordinate with the applied electric field strength ($MVm^{-1}$) as abscissa;

FIG. 6 depicts, for a 7% v/v metal-free phthalocyanine suspension, the variation of developed static yield strength (kPa) as ordinate with the applied electric field strength ($MVm^{-1}$) as abscissa.

EXAMPLE 2

This Example illustrates the preparation of a series of poly(acene-quinone)s; and their formulation and testing as electrorheological fluids in accordance with the invention.

Equimolar quantities of 1,2,4,5-benzenetetracarboxylic dianhydride (ex Aldrich Clemicals Co. Ltd.) and an aromatic acene (either naphthalene ex Hopkin and Williams Ltd. or pyrene ex Aldrich Chemicals Co. Ltd.) were mixed by trituration in a mortar. Two moles of zinc chloride (ex BDH Chemicals Ltd.) per mole of the dianhydride were then added, as catalyst, to the mixture; this mixture was next placed in a Pyrex tube ("PYREX" is a registered Trade Mark) and heated to 300° C. in a constant temperature bath for 24 hours. (It had been found, in experiments of Pohl et al. (ubi supra), that the presence or otherwise of air in the reaction vessel had but little effect on the conductivity of the resulting polymer; accordingly, in this series of preparations the Pyrex tube was simply stoppered.)

At the end of that time, the resulting polymer was filtered off and ground to a fine powder. The powder was then leached with dilute (2N) hydrochloric acid for 24 hours to assist in removing zinc chloride. The leached powder was subsequently extracted with distilled, deionised water for 24 hours; ethanol (ex May and Baker Ltd.) for 24 hours; and benzene (ex May and Baker Ltd.) for 72 hours, all in a Soxhlet apparatus.

The poly(acene-quinone)s were then dried at 50° C. for 72 hours in a vacuum oven. After drying, the polymers (which were black in colour) were finely ground in a micronising mill and stored in a dessicator.

The density of the poly(pyrene-quinone) was found to be 1.51 g $cm^{-3}$; that of the poly(naphthalene-quinone) was 1.50 g $cm^{-3}$. Different volume fractions, detailed below, of each polymer were dispersed in the 3:1 paraffin oil:paraffin grease mixture decribed above, the viscosity of which permitted a stable dispersion of the polymer to be formulated. Different volume fractions, again detailed below, of each polymer were dispersed in a polychlorinated hydrocarbon (CERECLOR 50 LV ex ICI plc) to formulate a stable dispersion of the polymer. A further volume fraction of each such polymer dispersed in a silicone oil (DC550 ex Hopkin & Williams) to formulate a stable dispersion of the polymer.

The dispersions were electrorheological fluids of the invention: they were then tested in the yield point meter hereinbefore described; the test results are depicted graphically in FIGS. 7 to 16 inclusive.

Figure 7:
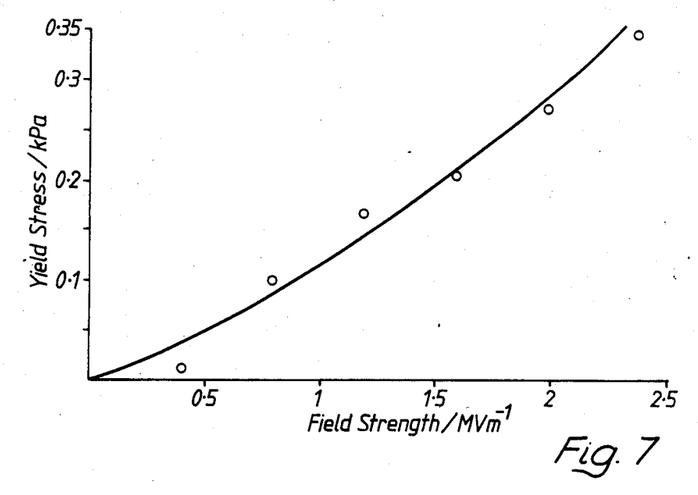
Figure 8:
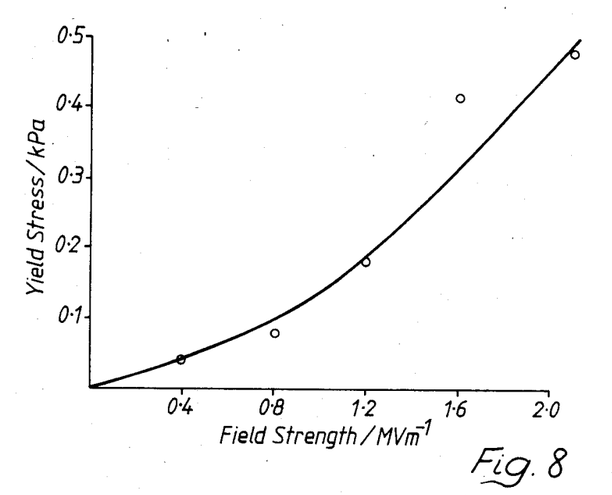
Figure 9:
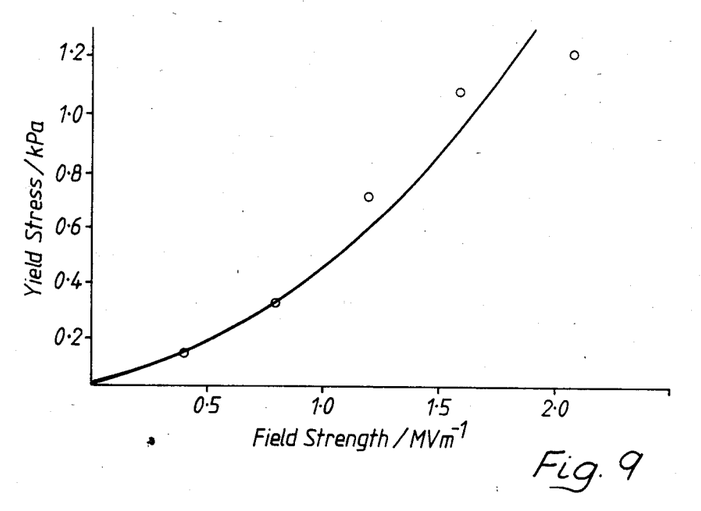
Figure 10:
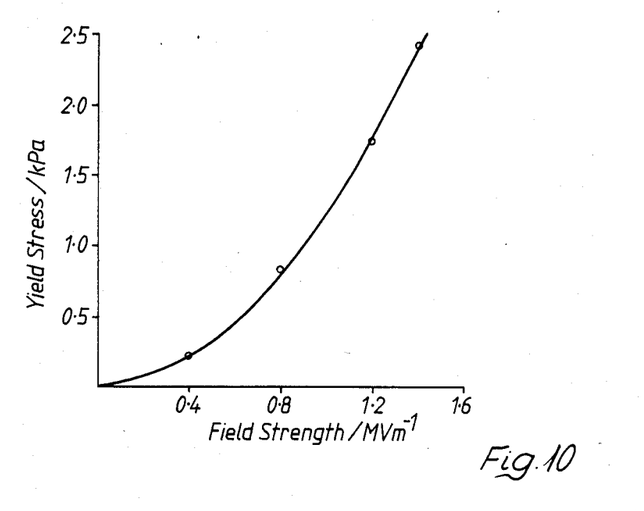
Figure 11:
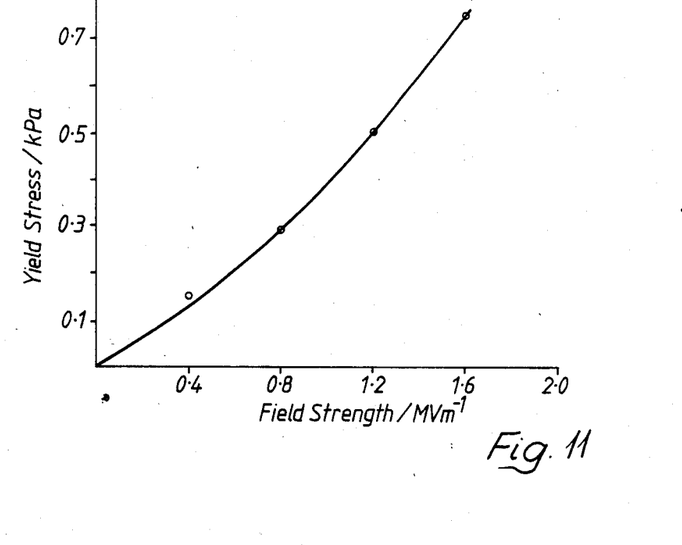
Figure 12:
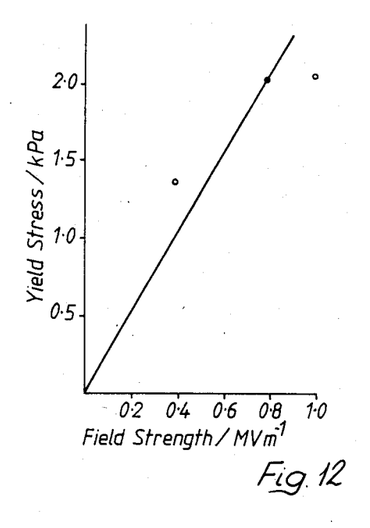
Figure 13:
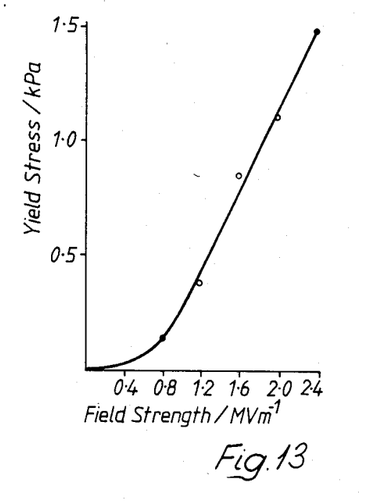
Figure 14:
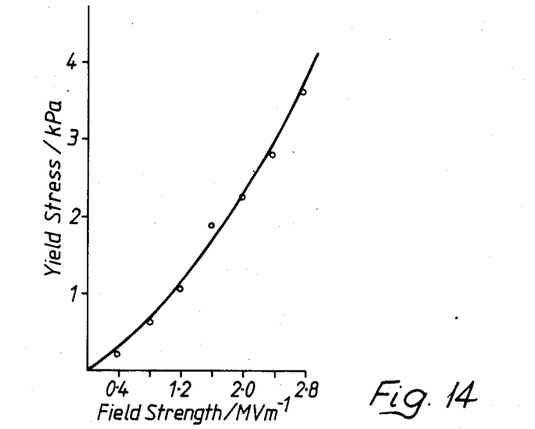
Figure 15:
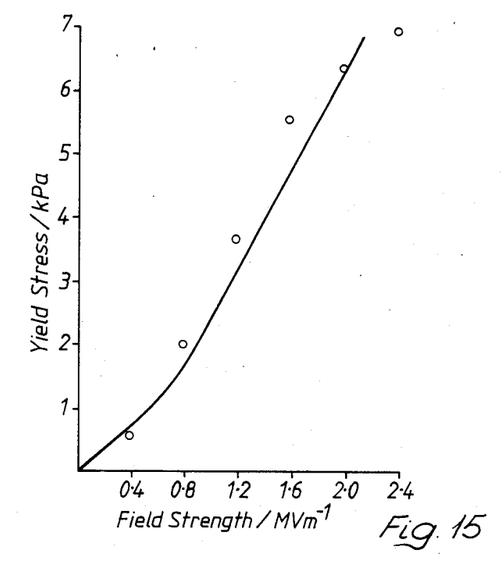
Figure 16:
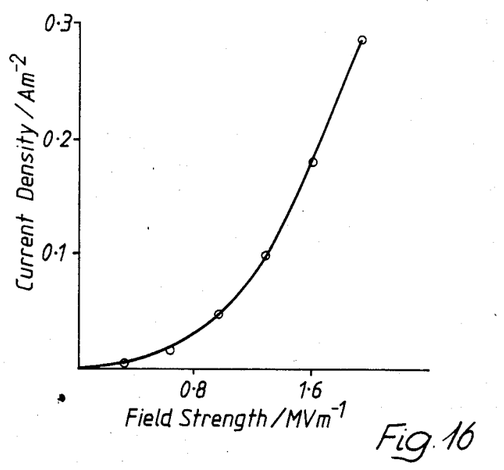

In these Figures:

FIG. 7 depicts, for a 17% v/v poly(pyrene-quinone) suspension in paraffin, the variation of developed static yield strength (kPa) as ordinate with the applied electric field strength ($MVm^{-1}$) as abscissa;

FIGS. 8, 9 and 10 depict, for 21, 33 and 40% v/v, respectively, poly(pyrene-quinone) suspensions in paraffin, the variation of developed static yield strength (kPa) as ordinate with the applied electric field strength ($MVm^{-1}$) as abscissa;

FIG. 11 depicts, for a 30% v/v poly(pyrene-quinone) suspension in silicone oil, the variation of developed static yield strength (kPa) as ordinate with the applied field strength ($MVm^{-1}$) as abscissa;

FIG. 12 depicts, for a 40% v/v poly(pyrene-quinone) suspension in polychlorinated hydrocarbon, the variation of developed static yield strength (kPa) as ordinate with the applied field strength ($MVm^{-1}$) as abscissa;

FIGS. 13 and 14 depict, for 30 and 38% v/v, respectively, poly(naphthalene-quinone) suspensions in paraffin, the variation of developed static yield strength (kPa) as ordinate with the applied field strength ($MVm^{-1}$) as abscissa;

FIG. 15 depicts, for a 40% v/v poly(naphthalene-quinone) suspension in polychlorinated hydrocarbon, the variation of developed static yield strength (kPa) as ordinate with the applied field strength ($MVm^{-1}$) as abscissa; and FIG. 16 depicts, for the liquid of FIG. 15, the current density passed ($Am^{-2}$) as ordinate with the applied field strength ($MVm^{-1}$) as abscissa.

In each case, even in the absence of water, a yield stress was developed; that developed from poly(acene-quninone)s dispersed in chlorinated hydrocarbon being particularly noteworthy.

What is claimed is:

1. An electrorheological fluid which comprises a liquid continuous phase and, dispersed therein, at least one dispersed phase and which is capable of functioning as such when at least the dispersed phase is substantially anhydrous.

2. An electrorheological fluid according to claim 1 which is capable of functioning as such when the fluid is substantially anhydrous.

3. An electrorheological fluid according to claim 1 wherein the dispersed phase comprises an electronic conductor.

4. An electrorheological fluid according to claim 3 wherein the electronic conductor is a semiconductor.

5. An electrorheological fluid according to claim 4 wherein the semiconductor comprises an unsaturated fused polycyclic system.

6. An electrorheological fluid according to claim 5 wherein the unsaturated fused polycyclic system is electron rich.

7. An electrorheological fluid according to claim 5 wherein the unsaturated fused polycyclic system is an aromatic fused polycyclic system.

8. An electrorheological fluid according to claim 5 wherein the organic semiconductor is polymeric.

9. An electrorheological fluid according to claim 8 wherein the organic semiconductor comprises a poly(acene-quinone) polymer.

10. An electrorheological fluid according to claim 9 wherein the poly(acene-quinone) polymer is produced by reacting, under Friedel-Crafts acylation conditions, at least one substituted or unsubstituted acene with at least one substituted or unsubstituted polyacylated aromatic compound.

11. An electrorheological fluid according to claim 1 wherein the continuous phase comprises a halogenated aromatic liquid.

12. An electrorheological fluid according to claim 1 wherein the loading of the dispersed phase in the continuous phase is from 15% v/v to 40% v/v.

13. An electrorheological fluid according to claim 1 which is capable of developing a static yield stress of at least 0.5 KPa under an applied electric field of no more than $3 MVm^{-1}$ when the fluid is substantially anhydrous.

14. An electrorheological fluid according claim 1 which is capable of passing a current density of no more than $400 Am^{-2}$ under an applied electric field of no more than $1 MVm^{-1}$ when the fluid is substantially anhydrous.

* * * * *